Patented Aug. 27, 1946

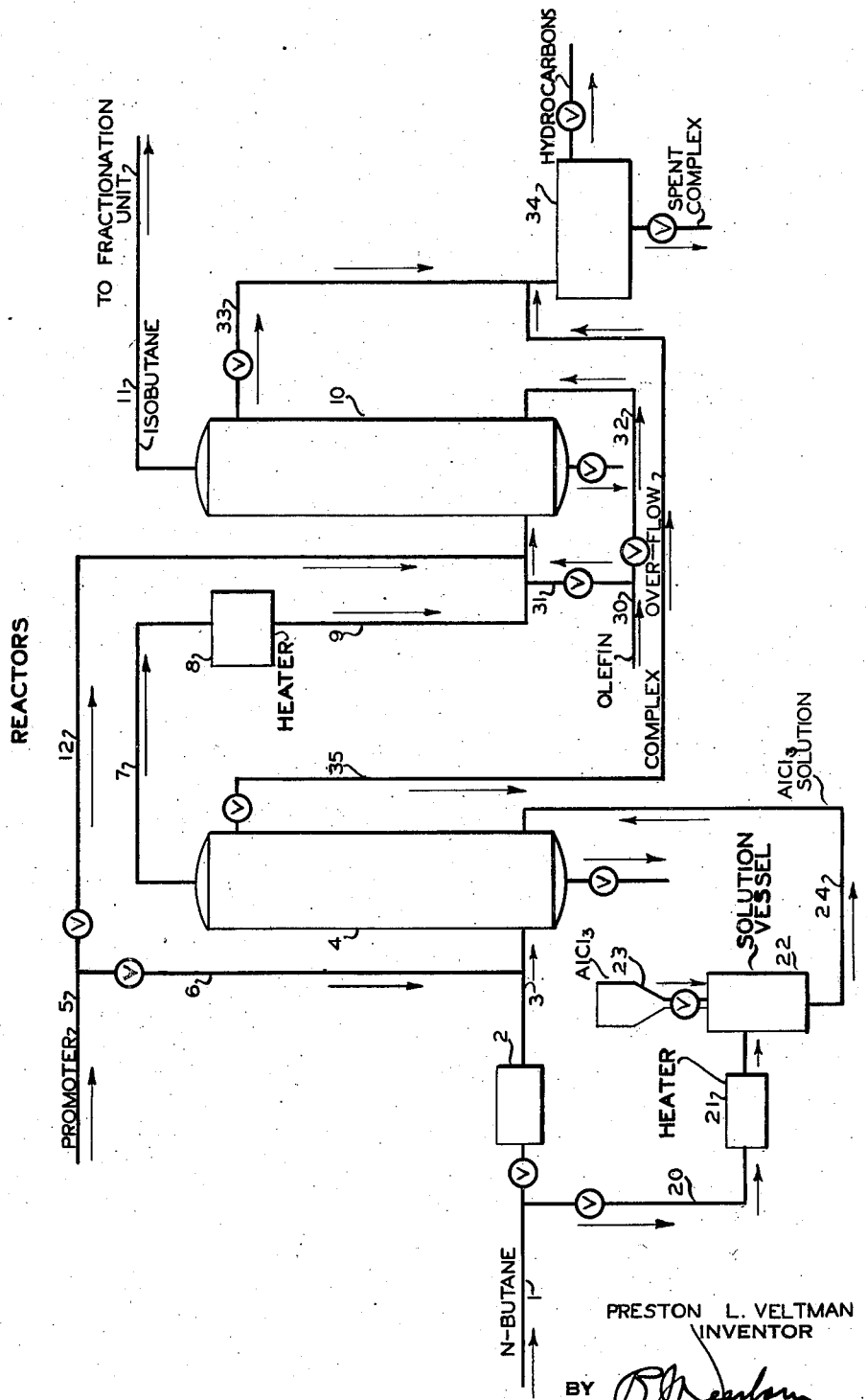

2,406,721

UNITED STATES PATENT OFFICE 2,406,721

CATALYTIC CONVERSION OF HYDROCARBONS

Preston L. Veltman, Port Arthur, Tex., assignor to The Texas Company, New York, N. Y., a corporation of Delaware Application July 10, 1943, Serial No. 494,187

15 Claims. (Cl. 260—683.5)

This invention relates to a continuous process for effecting catalytic conversions of hydrocarbons such as isomerization of saturated hydrocarbons.

The invention involves effecting conversion of the hydrocarbons in two or more reaction zones through which hydrocarbons undergoing treatment are passed in series flow, the hydrocarbons being subjected to contact in each zone with a liquid catalyst comprising metallic halide-hydrocarbon complex. The liquid catalyst in the initial zone contains a substantial amount of free or unreacted metallic halide while that in the final zone is maintained lean with respect to free metallic halide so that the effluent hydrocarbons therefrom are free or at least substantially free from metallic halide. A small amount of hydrocarbon material reactive toward metallic halide such as an olefin hydrocarbon is continuously introduced to the final reaction zone for the purpose of reacting with free metallic halide that may pass into the final reaction zone with hydrocarbons flowing from the preceding zone.

The invention has application in the isomerization of saturated hydrocarbons such as normal butane with an aluminum halide catalyst in the presence of a hydrogen halide promoter. The process of the invention involves using in the initial or primary reaction zone a liquid complex type of catalyst containing a substantial amount of free aluminum halide either dissolved or suspended in the complex liquid, and in the secondary or final zone complex liquid containing substantially no free aluminum halide. The complex liquid in the final zone is maintained sufficiently lean in free aluminum halide so that the effluent stream of hydrocarbons, which may be referred to as isomate, is free or at least substantially free from aluminum halide.

The catalyst is maintained lean by continuous introduction to the final reaction zone of a small amount of an olefin hydrocarbon such as propylene or butylene which reacts with free aluminum halide converting it to complex. Surplus complex accumulating in the final reaction zone is drawn off therefrom and may be disposed of in any suitable manner. For example, it may be used as a component of a catalyst for isomerizing higher molecular weight hydrocarbons or it may be used for treating hydrocarbon mixtures for the purpose of removing certain impurities therefrom.

According to a modification of the invention which is applicable in the isomerization of normal butane, normal pentane or a saturated paraffin hydrocarbon having from 5 to about 7 carbon atoms per molecule may be charged to the final reaction zone instead of olefin hydrocarbons. Isomerization of the heavier saturated hydrocarbon thus occurs in the final reaction zone in addition to further isomerization of normal butane. However, under conditions prevailing therein isomerization of the heavier hydrocarbons is accompanied by a small amount of cracking and the resulting unsaturated products of cracking are utilized to react and form complex with the free aluminum halide present in the liquid catalyst. The amount of such cracking is greatly reduced by the presence of the relatively large amount of isobutane in the hydrocarbon stream flowing through the final reaction zone. The presence of isobutane in large amount exerts an inhibiting effect so that cracking and other side reactions are suppressed to a large extent.

The amount of heavier hydrocarbons introduced as well as the temperature and promoter concentration may be regulated so as to provide sufficient hydrocarbon material as a result of hydrocarbon conversion to react with free aluminum halide and thus maintain the complex catalyst in the final reaction zone free from unreacted aluminum halide so that the effluent stream from this reaction zone will be free from aluminum halide.

The heavier saturated hydrocarbons so charged to the final reaction zone may be blended with the isomate stream entering this reaction zone or may be separately injected thereto.

Actually this modification may be practiced so as to effect substantial isomerization of higher molecular weight paraffin hydrocarbons in the secondary zone. Thus, normal butane may be isomerized in the primary zone and the resulting stream of isobutane containing dissolved aluminum or other metallic halide continuously passed to the secondary zone. A separate stream of normal pentane may be continuously introduced to the secondary zone in substantial amount. The secondary zone may be maintained at substantially the same temperature as prevails in the primary zone or at a somewhat lower temperature more favorable for isomerizing normal pentane without realizing excessive cracking. In other words conditions are controlled so that isomerization of normal pentane is secured but such that some pentane is consumed in reacting with unreacted aluminum halide present in the complex liquid catalyst. Conditions are thus maintained so that the effluent stream of isobutane and isopentane from the secondary reaction zone is free from aluminum halide.

It has been found that when hydrocarbons in liquid phase pass through a reaction zone containing a catalyst which comprises at least in part unreacted aluminum halide the effluent hydrocarbon stream from the reaction zone contains aluminum halide dissolved therein. Upon reduction in temperature, or upon evaporation of a portion of the hydrocarbons, aluminum halide precipitates from the effluent stream so that solid aluminum halide will thus accumulate in pipes, exchangers, evaporators, and subsequent points in the system through which the effluent hydrocarbons are moved during the further course of their processing.

Even when the amount of unreacted aluminum halide is relatively small in the liquid complex catalyst, migration of aluminum halide from the reaction zone occurs with consequent fouling of the process equipment.

In isomerization of normal butane it is advantageous to employ a catalyst containing some free aluminum halide so as to realize a high per cent conversion at a moderate reaction temperature level, while avoiding objectionable side reactions and catalyst deterioration.

Consequently, the present invention contemplates realizing these objectives while at the same time avoiding migration of catalyst as a solution in the product stream with consequent deposition of the catalyst in pipes and fractionating equipment. This is accomplished in accordance with the present invention by employing a catalyst of high aluminum halide content in a primary reaction zone and providing a secondary reaction zone capable of effecting further isomerization as well as complete or substantially complete removal or consumption of free aluminum halide present in the effluent stream of hydrocarbons from the primary reaction zone.

In this way a high per cent conversion of normal butane to isobutane is realized. In addition a high yield of product per pound of aluminum halide is obtained. Moreover high rates of hydrocarbon throughout are possible.

In order to describe the invention more fully reference will now be made to the accompanying drawing comprising a flow diagram which illustrates one method of practicing the process.

As indicated in the drawing normal butane is conducted from a source not shown through a pipe 1 to a heater or heat exchanger 2 wherein it may be raised to a temperature of 160 to 240° F. The heated butane passes through a pipe 3 to the lower portion of a primary reactor 4.

The reactor 4 advantageously comprises a vertical tower containing a column of liquid complex catalyst formed by reacting aluminum chloride with a hydrocarbon as will be described later. The column of liquid may range from about 10 to 40 feet in height but will usually range from about 15 to 25 feet.

The reactor 4 is maintained under pressure sufficient to keep the heated normal butane substantially in the liquid phase. The feed hydrocarbons are dispersed in particle or droplet form within the bottom portion of the liquid catalyst column and the dispersed hydrocarbons rise through the liquid column without mechanical stirring. In other words, the liquid catalyst is maintained as a relatively stationary body of liquid.

A small amount of promoter such as hydrogen chloride is drawn from a source not shown through a pipe 5 and branch pipe 6 which latter may communicate with the previously mentioned pipe 3.

The amount of promoter introduced may range from 1 to 10% of the total normal butane charge and usually amounts to about 3 to 8%.

The treated hydrocarbons accumulating in the upper portion of the reactor 4 are continuously drawn off therefrom through a pipe 7 which may lead to a heater or heat exchanger 8. From the heat exchanger 8 the hydrocarbons pass through a pipe 9 leading to the bottom portion of a secondary reactor 10.

The hydrocarbons entering the reactor 10 may be at substantially the same or at a substantially higher temperature than that prevailing in the reactor 4. The reactor 10 is similar to the reactor 4 and also contains a stationary body of liquid complex catalyst maintained therein to a substantial depth which may be similar to that prevailing within the reactor 4. The complex catalyst in the reactor 10 will be referred to later but as previously indicated contains substantially no free aluminum halide.

The treated hydrocarbons accumulate in the upper portion of the reactor 10 and are continuously drawn off through a pipe 11 leading to a fractionating unit now shown.

It will be understood that the fractionating unit may comprise the conventional arrangement and type of apparatus having provision for recovery of hydrogen chloride promoter from the effluent hydrocarbons and also having provision for separating isomerized hydrocarbons from higher boiling or unreacted hydrocarbons, etc.

As indicated in the drawing promoter from a pipe 5 and branch pipe 12 may be continuously introduced to the lower portion of the reactor 10.

Referring again to the pipe 1 a branch pipe 20 is provided through which a portion of the normal butane feed may be diverted. The pipe 20 communicates with a heater or heat exchanger 21 wherein the diverted stream may be heated to a temperature in the range about 120 to 130° F. or even higher prior to introduction to a solution vessel 22. Solid aluminum chloride is introduced to the solution vessel from a hopper 23 and the heated normal butane flows through the vessel in direct contact with solid granular or lump aluminum chloride so that aluminum chloride is dissolved in the hydrocarbon stream.

The resulting solution is continuously drawn off from the vessel 22 through a pipe 24 which leads to the bottom portion of the reactor 4.

In this way the requisite amount of make-up aluminum chloride is continuously injected in the reactor 4, the amount so injected being sufficient to maintain the required amount of free aluminum chloride in the liquid catalyst body within the reactor.

Since free aluminum chloride is maintained present in the reactor 4 the effluent hydrocarbon stream or isomate flowing through the pipe 7 will contain a substantial amount of aluminum chloride dissolved therein. This dissolved aluminum chloride, which may amount to from 0.01 to 0.20% by weight of the effluent hydrocarbons thus passes to the reactor 10.

Aluminum chloride is relatively more soluble in the complex liquid than in the hydrocarbons so that by maintaining the complex liquid within the reactor 10 relatively free of unreacted aluminum halide the lean complex thus exerts a preferential solvent action upon the aluminum chloride entering the reactor in the isomate stream from the reactor 4.

A small amount of olefin such as propylene or butylene is continuously drawn from a source not shown through a pipe 30 and passed through a branch pipe 31 communicating with the previously mentioned pipe 9 by which means the olefin is injected into the reactor 10. If desired the olefin hydrocarbon may be passed through a branch pipe 32 which provides a separate point of introduction to the reactor 10.

The olefin hydrocarbon is highly reactive toward aluminum chloride entering into complex formation therewith, and therefore is introduced to the reactor 10 in an amount sufficient to maintain a complex liquid catalyst body therein free or substantially free from unreacted aluminum chloride or in such a state that essentially no free aluminum chloride is carried out in the hydrocarbon effluent.

There is thus some complex formation continually occurring within the reactor 10 so that surplus complex liquid accumulates within the reactor 10. This surplus is continuously drawn off from the upper portion of the reactor through a pipe 33 leading to a vessel 34.

Provision may be made for conducting surplus complex from the reactor 4 through a pipe 35 leading to the vessel 34. A small amount of complex formation may occur within the reactor 4 due to the reaction between aluminum chloride and normal butane feed, the extent of such reaction being relatively small.

The amount of olefin added to the reactor 10 is relatively small and may range from about 0.01 to 1% by weight of the total hydrocarbons leaving the reactor 4, and passing to the reactor 10. Consequently, the amount of complex passed to the vessel 34 is relatively small.

In actual practice, when isomerizing a feed stream consisting essentially of normal butane, the butane may be charged to the primary reactor at the rate of about 250 to 300 gallons per square foot of reactor internal horizontal cross-sectional area per hour. The make-up aluminum chloride injected through the pipe 24 is such as to maintain a complex catalyst liquid body within the reactor 4 characterized by having a heat of hydrolysis of about 340 to 360 calories per gram of liquid catalyst or substantially above about 315 or 320 calories. The amount so added is preferably sufficient to maintain a substantial amount of unreacted aluminum chloride within the complex liquid thus causing a small amount to appear in the effluent hydrocarbon from the first reactor.

The complex liquid catalyst within the reactor 10 is maintained of such character that its heat of hydrolysis does not exceed about 310 to 320 calories per gram of catalyst liquid and may be as low as about 200 calories.

With a complex liquid catalyst having a heat of hydrolysis of about 340 to 360 calories in the reactor 4 and at a temperature of about 200° F., in the presence of hydrogen chloride amounting to about 3 to 4% by weight of feed hydrocarbon, normal butane in the charge stream undergoing treatment will be converted to about 50 to 55% isobutane.

The resulting effluent hydrocarbon stream is then passed through the reactor 10 in the presence of promoter at a temperature of about 220° F., the complex catalyst having a heat of hydrolysis of not greater than about 320. The isomate stream leaving the reactor 10 will comprise about 60% isobutane, the remaining hydrocarbons consisting substantially entirely of unreacted normal butane.

The yield of isobutane so obtained will amount to about 250 to 300 gallons or more per pound of aluminum chloride introduced to the reactor 4, depending on the purity of the feed hydrocarbons.

In starting up the system a preformed complex may be used which is obtained by reacting aluminum chloride with kerosene, for example, in the presence of hydrogen chloride at a temperature of about 200 to 300° F. However, it is contemplated that a suitable complex may be prepared by reacting aluminum halide with any suitable hydrocarbon in the presence of hydrogen chloride so as to obtain a complex liquid catalyst characterized by having a heat of hydrolysis within the ranges already specified.

Complex accumulated from previous operations may be employed by incorporating therein additional amounts of aluminum halide if necessary in order to bring the complex liquid catalyst up to the proper aluminum halide concentration.

It appears that some complex is formed in situ during the course of the reaction so that in time the catalyst within the reactors may consist essentially of catalyst formed in situ.

While isomerization of normal butane has been described specifically nevertheless it is contemplated that the process has application to the conversion treatment of other hydrocarbons. For instance, it may be applied to the isomerization of saturated hydrocarbons such as pentane, hexane, heptane, etc., or mixtures thereof and also naphtha or fractions of naphtha.

As previously intimated isomerization of normal butane with pentane and higher molecular weight hydrocarbons may be carried out in the same operation. Thus, normal butane is charged to the system flowing through the several reactors in series while pentane or heavier paraffin hydrocarbon is charged to the final reaction zone in amount sufficient to maintain the complex catalyst in the final reaction zone sufficiently lean in aluminum halide so that the effluent hydrocarbon stream is free from aluminum halide.

This effluent hydrocarbon stream will thus contain isobutane as well as the higher molecular weight isoparaffins and this stream may be passed to a suitable fractionating system wherein separation between the isoparaffins of different molecular weight may be effected as desired.

It is contemplated that the procedure described may have application in effecting other conversion reactions besides isomerization wherein the metallic halide-hydrocarbon complex type of catalyst is used at temperatures ranging from normal room temperature up to about 300° F.

Mention has been made of effecting isomerization of normal butane in the liquid phase, however, it is contemplated that the conversion reaction may be effected with hydrocarbons undergoing treatment in either the gas or liquid phase or in mixed phase.

Other promoters besides hydrogen chloride may be used including other hydrogen halides.

Propylene and butylene have been specifically mentioned although it is contemplated that other olefins or other hydrocarbons reactive toward aluminum halide at moderate temperatures, for example, ranging from 150 to 300° F. may be employed.

It is contemplated that introduction of the small amount of olefin to the secondary reactor 10 may give rise to the occurrence of a small amount of alkylation therein as a result of reaction between olefin and isoparaffins entering the reactor. The resulting alkylated hydrocarbons will pass out of the system with the isomate stream and may also be utilized as valuable constituents in the manufacture of gasoline.

The method described is useful irrespective of the particular type of reactors employed. The reactors may be packed or unpacked towers or they may be mechanically agitated reactors.

It is contemplated that if desired the complex catalyst in the primary reactor may have aluminum halide present in solid form suspended therein. However, it is preferred to maintain the catalyst free or substantially free of undissolved aluminum halide.

It is contemplated that the isomerization reaction in either stage may be carried out in the presence of additive materials, usually in relatively small proportion, such as naphthenes, hydrogen and low molecular weight aromatics. Isobutane has already been mentioned as useful in inhibiting cracking reactions in the second stage where pentane and higher molecular weight hydrocarbons are undergoing isomerization. However, it may be preferable in certain cases to employ a small amount of another additive or inhibiting agent such as the foregoing.

These additive or inhibiting agents may be used so as to permit operating at higher reaction temperatures. For example, it may be advantageous to employ the inhibitor in the second stage using the complex catalyst of lower aluminum halides content at a substantially higher reaction temperature.

Under certain conditions of operation, as, for example, when isomerizing normal butane in the manner illustrated in the drawing wherein olefin hydrocarbons are introduced to the second stage spent complex drawn off from the second stage may have properties which render it suitable for conditioning the complex catalyst used in the primary stage. Thus, after prolonged periods of operation the catalyst in the primary stage may become less fluid so that the addition of a small amount of conditioning material may be desirable for the purpose of increasing the fluidity of the complex catalyst or of restoring its fluidity. Accordingly, it is contemplated that a small amount of the spent complex produced in the second stage may be recycled to the primary stage from time to time for the purpose of conditioning the catalyst in the primary stage.

Obviously many modifications and variations of the invention as above set forth may be made without departing from the spirit and scope thereof, and therefore only such limitations should be imposed as are indicated in the appended claims.

I claim:

1. In a continuous process for isomerizing saturated hydrocarbons by the action of a Friedel-Crafts metallic halide isomerization catalyst in the presence of hydrogen halide, the metallic halide being at least partially soluble in hydrocarbons undergoing treatment, the steps comprising passing a stream of saturated feed hydrocarbon to a primary reaction zone, subjecting the hydrocarbons in said zone to contact in liquid phase with a catalyst comprising at least in part free metallic halide, effecting said contact in the presence of hydrogen halide under conditions such that substantial conversion to isomers occurs and some metallic halide is dissolved in the hydrocarbons, passing a stream containing isomerized hydrocarbons and metallic halide dissolved therein from the primary zone to a secondary zone, subjecting said stream in the secondary zone to contact in liquid phase with a body of metallic halide-hydrocarbon complex liquid substantially free from unreacted metallic halide, effecting said secondary contact under isomerizing conditions, injecting a small amount of olefin hydrocarbon to the secondary reaction zone sufficient to consume substantially said metallic halide dissolved in said stream passing to the secondary zone, thereby forming complex in situ, removing from said secondary zone a hydrocarbon stream containing isomerized hydrocarbons substantially free from dissolved metallic halide and separately discharging from the secondary zone excess complex liquid accumulating therein.

2. The process according to claim 1 in which the metallic halide is aluminum halide.

3. In a continuous process for isomerizing saturated hydrocarbons by the action of a Friedel-Crafts metallic halide isomerization catalyst in the presence of hydrogen halide, the metallic halide being at least partially soluble in hydrocarbons undergoing treatment, the steps comprising passing a stream of normal butane to a primary reaction zone, subjecting the normal butane in said zone to contact in liquid phase with a catalyst comprising at least in part free aluminum halide, effecting said contact in the presence of hydrogen halide under conditions such that substantial conversion to isobutane occurs and some aluminum halide is dissolved in the hydrocarbons, passing a stream containing isobutane and aluminum halide dissolved therein from the primary zone to a secondary zone, subjecting said stream in the secondary zone to contact in liquid phase with a body of aluminum halide-hydrocarbon complex substantially free from unreacted aluminum halide, effecting said secondary contact under isomerizing conditions, injecting a small amount of olefin hydrocarbon to the secondary reaction zone sufficient to consume substantially said aluminum halide dissolved in said stream passing to the secondary zone, thereby forming complex in situ, removing from said secondary zone a hydrocarbon stream containing isobutane substantially free from dissolved aluminum halide and separately discharging from the secondary zone excess complex liquid accumulating therein.

4. The process according to claim 3 in which the olefin is introduced to the secondary zone in amount sufficient to maintain the body of liquid complex therein of such character that the heat of hydrolysis does not exceed about 320 calories per gram of complex liquid.

5. The process according to claim 3 in which the amount of olefin introduced to the secondary reaction zone is sufficient to maintain the body of liquid complex therein substantially free from solid aluminum halide.

6. A continuous process for isomerizing normal butane which comprises passing normal butane to a primary reaction zone, subjecting the butane in liquid phase therein to contact with a catalyst comprising aluminum halide-hydrocarbon complex liquid containing free aluminum halide in substantial amount, effecting said contact in the presence of hydrogen halide at a temperature not in excess of about 300° F. such that substantial conversion to isobutane occurs and some free aluminum halide is dissolved in the hydrocarbons, continuously injecting aluminum halide to said primary reaction zone sufficient to maintain some unreacted aluminum halide in said complex liquid, passing a stream containing isobutane in liquid phase and dissolved aluminum halide from the primary zone to a secondary zone, subjecting said stream in the secondary zone to contact with a body of aluminum halide-hydrocarbon complex liquid substantially free from unreacted aluminum halide, injecting a small amount of olefin hydrocarbon to said secondary zone sufficient to consume substantially dissolved aluminum halide contained in the butane stream entering the secondary zone and form thereby complex, effecting said secondary contact under isomerizing conditions, removing from said secondary zone a stream of isobutane substantially free from dissolved aluminum halide and separately discharging therefrom excess aluminum halide-hydrocarbon complex liquid.

7. The process according to claim 6 in which the amount of aluminum halide added to the primary reaction zone is sufficient to maintain the complex catalyst therein of such character that it has a heat of hydrolysis in the range about 340 to 360 calories per gram of catalyst liquid.

8. The process according to claim 6 in which the reaction in the primary zone is effected at a temperature not in excess of about 200° F. and the reaction in the secondary zone is effected at a temperature not in excess of about 220° F.

9. In a continuous process for isomerizing saturated hydrocarbons by the action of a Friedel-Crafts metallic halide isomerization catalyst in the presence of hydrogen halide, the metallic halide being at least partially soluble in hydrocarbons undergoing treatment, the steps comprising passing a stream of normal butane to a primary reaction zone, subjecting the normal butane in said zone to contact in liquid phase with a catalyst comprising at least in part free aluminum halide, effecting said contact in the presence of hydrogen halide under conditions such that substantial conversion to isobutane occurs and some aluminum halide is dissolved in the hydrocarbons, passing a stream containing isobutane and aluminum halide dissolved therein from the primary zone to a secondary zone, subjecting said stream in liquid phase in the secondary zone to contact with a body of aluminum halide-hydrocarbon complex liquid substantially free from unreacted aluminum halide, injecting a small amount of hydrocarbon reactive toward free metallic halide sufficient to consume substantially aluminum halide dissolved in said stream passing to the secondary zone, effecting the contact between hydrocarbons and catalyst in the secondary zone under isomerizing conditions, removing from said secondary zone a hydrocarbon stream containing isobutane substantially free from dissolved aluminum halide and separately discharging from the secondary zone excess complex liquid accumulating therein.

10. The method according to claim 9 in which the hydrocarbon reactive toward free metallic halide is a saturated hydrocarbon of higher molecular weight than butane.

11. In a continuous process for isomerizing saturated hydrocarbons by the action of a Friedel-Crafts metallic halide isomerization catalyst in the presence of hydrogen halide, the metallic halide being at least partially soluble in hydrocarbons undergoing treatment, the steps comprising passing a stream of normal butane to a primary reaction zone, subjecting the normal butane in said zone to contact in liquid phase with a catalyst comprising at least in part free aluminum halide, effecting said contact in the presence of hydrogen halide under conditions such that substantial conversion to isobutane occurs and some aluminum halide is dissolved in the hydrocarbons, passing a stream containing isobutane and aluminum halide dissolved therein from the primary zone to a secondary zone, subjecting said stream in liquid phase in the secondary zone to contact with a body of aluminum halide-hydrocarbon complex liquid substantially free from unreacted aluminum halide, injecting a saturated normal paraffin hydrocarbon having from about 5 to 7 carbon atoms per molecule to the secondary reaction zone, maintaining the secondary reaction zone under isomerizing conditions such that normal butane and higher molecular weight paraffins are isomerized, a portion of said higher molecular weight hydrocarbons reacting with aluminum halide dissolved in the stream passing to the secondary reaction zone to form complex, removing from said secondary zone a hydrocarbon stream containing isomerized hydrocarbons substantially free from dissolved aluminum halide and separately discharging from the secondary zone excess complex liquid accumulating therein.

12. A continuous process for isomerizing saturated hydrocarbons by contact with aluminum chloride which comprises maintaining in a primary reaction zone a column of liquid catalyst comprising aluminum chloride-hydrocarbon complex containing free aluminum chloride, injecting feed hydrocarbons to the lower portion of said column, dispersing the injected hydrocarbons in liquid phase upwardly through said column in the presence of hydrogen halide at an elevated temperature not in excess of about 300° F., such that substantial isomerization occurs, continuously removing from the upper portion of said primary column an effluent stream of hydrocarbons in liquid phase containing a small amount of dissolved aluminum chloride, passing said effluent stream to a secondary zone containing a secondary column of aluminum chloride-hydrocarbon complex isomerization catalyst which is maintained substantially free from unreacted aluminum chloride, dispersing the effluent hydrocarbons in liquid phase upwardly through said secondary column in the presence of hydrogen halide at an elevated temperature not in excess of about 300° F. such that isomerization occurs, injecting to the secondary reaction zone a small amount of hydrocarbon reactive towards free aluminum chloride at said elevated temperature and sufficient to consume substantially said dissolved aluminum chloride in the effluent stream passing to the secondary zone, continuously removing from the upper portion of the secondary zone a secondary effluent hydrocarbon stream containing isoparaffins substantially free from dissolved aluminum chloride, and separately removing from the secondary zone excess complex liquid accumulating therein.

13. A continuous process for isomerizing saturated hydrocarbons by contact with aluminum chloride which comprises maintaining in a primary reaction zone a column of liquid catalyst comprising aluminum chloride-hydrocarbon complex containing unreacted aluminum chloride and characterized by having a heat of hydrolysis substantially above 320 calories per gram of complex, injecting feed hydrocarbons to the lower portion of said column, dispersing the injected hydrocarbons in liquid phase upwardly through said column in the presence of hydrogen halide at an elevated temperature not in excess of about 300° F., such that substantial isomerization occurs, continuously removing from the upper portion of said primary column an effluent stream of hydrocarbons in liquid phase containing a small amount of dissolved aluminum chloride, passing said effluent stream to a secondary zone containing a secondary column of aluminum chloride-hydrocarbon complex isomerization catalyst characterized by having a heat of hydrolysis substantially below 320 calories per gram of complex and which is maintained substantially free from unreacted aluminum chloride, dispersing the effluent hydrocarbons in liquid phase upwardly through said secondary column in the presence of hydrogen halide at an elevated temperature not in excess of about 300° F. such that isomerization occurs, injecting to the secondary zone a small amount of olefin and sufficient to consume substantially said dissolved aluminum chloride in the effluent stream passing to the secondary zone, continuously removing from the upper portion of the secondary zone a secondary effluent hydrocarbon stream containing isoparaffins substantially free from dissolved aluminum chloride.

14. The process according to claim 13 in which the complex catalyst in the primary column is characterized by having a heat of hydrolysis of about 340 to 360 calories per gram of complex while the catalyst in the secondary column is characterized by having a heat of hydrolysis in the range about 200 to 320 calories per gram of complex.

15. In a continuous process for isomerizing saturated hydrocarbons by the action of a Friedel-Crafts metallic halide isomerization catalyst in the presence of hydrogen halide, the metallic halide being at least partially soluble in hydrocarbons undergoing treatment, the steps comprising passing a stream of saturated feed hydrocarbon in liquid phase to a primary reaction zone, subjecting said hydrocarbons in said zone to contact with a catalyst comprising at least in part free metallic halide, effecting said contact in the presence of hydrogen halide under conditions such that substantial conversion to isomers occurs as the principal reaction and some metallic halide is dissolved in the hydrocarbons, passing a stream containing isomerized hydrocarbons and metallic halide dissolved therein from the primary zone to a secondary zone, subjecting said stream in the secondary zone to contact in liquid phase with a body of metallic halide-hydrocarbon complex liquid substantially free from unreacted metallic halide, effecting said secondary contact under isomerizing conditions, injecting to the secondary reaction zone a small amount of hydrocarbon reactive towards said free metallic halide under said isomerizing conditions and sufficient to consume substantially said dissolved metallic halide in the hydrocarbons passing to the secondary zone, removing from the secondary zone a hydrocarbon stream containing isomerized hydrocarbons substantially free from dissolved metallic halide, and separately discharging from the secondary zone excess complex liquid accumulating therein.

PRESTON L. VELTMAN.